United States Patent
Vlastuin et al.

(10) Patent No.: US 10,035,582 B2
(45) Date of Patent: Jul. 31, 2018

(54) PROPELLER BLADE FOR A TURBOMACHINE

(71) Applicant: SNECMA, Paris (FR)

(72) Inventors: Jonathan Evert Vlastuin, Charenton (FR); Clement Marcel Maurice Dejeu, Fontenailles (FR)

(73) Assignee: SNECMA, Paris (FR)

( * ) Notice: Subject to any disclaimer, the term of this patent is extended or adjusted under 35 U.S.C. 154(b) by 179 days.

(21) Appl. No.: 14/649,736

(22) PCT Filed: Dec. 5, 2013

(86) PCT No.: PCT/FR2013/052962
§ 371 (c)(1),
(2) Date: Jun. 4, 2015

(87) PCT Pub. No.: WO2014/087109
PCT Pub. Date: Jun. 12, 2014

(65) Prior Publication Data
US 2015/0315915 A1 Nov. 5, 2015

(30) Foreign Application Priority Data
Dec. 7, 2012 (FR) ..................................... 12 61805

(51) Int. Cl.
*B64C 11/18* (2006.01)
*B64D 27/00* (2006.01)
(Continued)

(52) U.S. Cl.
CPC .............. *B64C 11/48* (2013.01); *B64C 11/18* (2013.01); *F01D 5/141* (2013.01); *F01D 5/145* (2013.01);
(Continued)

(58) Field of Classification Search
CPC ... B64C 11/18; B64C 11/48; B64D 2027/005; F01D 5/141; F01D 5/145; F05D 2240/30;
(Continued)

(56) References Cited

U.S. PATENT DOCUMENTS

| | | | | |
|---|---|---|---|---|
| 3,467,197 | A | * | 9/1969 | Drees .................... B64C 27/463 416/228 |
| 4,012,172 | A | * | 3/1977 | Schwaar ................. F01D 5/141 416/223 A |
| 5,190,441 | A | * | 3/1993 | Murphy ................ B64C 11/008 415/119 |

(Continued)

FOREIGN PATENT DOCUMENTS

| FR | 2964426 A1 | * 3/2012 | ............ B64C 11/18 |
|---|---|---|---|
| WO | WO 2012/080669 A1 | 6/2012 | |
| WO | WO 2012/140385 A1 | 10/2012 | |

OTHER PUBLICATIONS

International Search Report dated Apr. 11, 2014, in PCT/FR2013/052962, filed Dec. 5, 2013.

*Primary Examiner* — Jason Shanske
*Assistant Examiner* — Christopher R Legendre
(74) *Attorney, Agent, or Firm* — Oblon, McClelland, Maier & Neustadt, L.L.P.

(57) ABSTRACT

A propeller blade extending radially between a blade root and a blade tip and having a leading edge and a trailing edge, together with a pressure side face and a suction side face. Along the leading edge, the angle (α) between the radial direction and a tangent to the leading edge passes through a local maximum $z_{max}$ situated in the range 60% to 80% of the height of the blade. Furthermore, the suction side face of the blade includes an indentation extending axially from the leading edge to the trailing edge and located at a height of the blade between the local maximum $z_{max}$ and the blade tip.

9 Claims, 5 Drawing Sheets

(51) Int. Cl.
  *F01D 5/14* (2006.01)
  *B64C 11/48* (2006.01)
(52) U.S. Cl.
  CPC .... *B64D 2027/005* (2013.01); *F05D 2220/30* (2013.01); *F05D 2240/30* (2013.01); *F05D 2240/303* (2013.01); *F05D 2240/307* (2013.01); *Y02T 50/66* (2013.01); *Y02T 50/673* (2013.01)
(58) Field of Classification Search
  CPC ......... F05D 2240/303; F05D 2240/307; F05D 2240/306
  USPC ................................................ 416/238, 242
  See application file for complete search history.

(56) References Cited

U.S. PATENT DOCUMENTS

| | | | |
|---|---|---|---|
| 6,341,942 B1 | 1/2002 | Chou et al. | |
| 6,358,003 B2* | 3/2002 | Schlechtriem | F01D 5/141 415/119 |
| 9,593,582 B2* | 3/2017 | Dejeu | B64C 11/18 |
| 2010/0124500 A1 | 5/2010 | Lebrun | |
| 2010/0150729 A1* | 6/2010 | Kirchner | F01D 5/12 416/223 R |
| 2013/0149109 A1* | 6/2013 | Webster | F01D 5/145 415/119 |
| 2013/0266451 A1 | 10/2013 | Pesteil et al. | |
| 2014/0301844 A1* | 10/2014 | Vion | F01D 5/141 416/129 |
| 2015/0315915 A1* | 11/2015 | Vlastuin | B64C 11/18 416/223 A |

\* cited by examiner

PROPELLER BLADE FOR A TURBOMACHINE

BACKGROUND OF THE INVENTION

Field of the Invention

The present invention relates to a propeller blade for a turbine engine, and also to an unducted propeller including a plurality of such blades and to a turbine engine having such a propeller.

Description of the Related Art

A turbine engine of this type includes two external propellers mounted to be contrarotating on a common axis, respectively an upstream propeller and a downstream propeller, which propellers are driven in rotation by a turbine of the turbine engine and extend substantially radially outside the nacelle of the turbine engine.

This type of turbine engine having two unducted contrarotating propellers presents very great potential for reducing fuel consumption compared with present-day bypass turbojets. Nevertheless, such devices having fast contrarotating and unducted propellers on a common axis present the drawback of relatively high sound emissions.

One of the main factors contributing to such sound emissions lies in the interaction between the contrarotating propellers, and in particular in the impact of blade tip vortices from the first propeller being carried away in the flow direction of the propulsive fluid against the blades of the second propeller situated downstream.

In order to remedy that drawback, proposals have been made to reduce the radial size of the second propeller so that the vortices generated by the blades of the first propeller pass radially outside the blade tips of the second propeller situated downstream. That solution gives rise to a reduction of propulsive efficiency, which is undesirable.

In another solution proposed in Document FR 2 935 349, a stream of air is injected into the blades of the first propeller and exits at the blade tips so as to weaken the vortices generated by the first propeller. In yet another solution, as described in Document EP 2 287 072, the air exiting from the blade tip generates a second vortex that is co-rotating with the first vortex and that is suitable for destabilizing the first vortex by friction.

In Document FR 11/53315 in the name of the Applicant, proposals are made to vary the angle of inclination of the leading edge relative to a radial direction so that this angle passes through a local maximum in the top portion of the blade. That particular shape for the leading edge of the blade serves to generate a second vortex rotating in the same direction as the blade tip vortex. The second vortex propagates over the suction side face of the blade in a downstream direction and radially outwards and then it interacts with the vortex formed at the blade tip. Friction between the two vortices dissipates their energy and destabilizes them, thereby serving to reduce sound emissions, which is particularly large at takeoff due to the high speeds of rotation of the propellers.

Nevertheless, the second vortex is generated continuously and it decreases the aerodynamic propulsive performance of the two contrarotating propellers in all stages of flight, and in particular at cruising speed.

Finally, Document WO 2012/080669 in the name of the Applicant discloses forming an indentation in the suction side face of a turbine blade so as to reduce the vortex formed between the turbine blade tip and an outer casing.

BRIEF SUMMARY OF THE INVENTION

An object of the present invention is to improve the propulsive efficiency of a propeller blade over its entire operating range while limiting sound nuisance due to the formation of vortices.

To this end, the invention provides a blade for mounting on a propeller, the blade extending radially in a height direction from a blade root to a blade tip and having a leading edge and a trailing edge, together with a pressure side face and a suction side face, the blade being characterized in that, along the leading edge, the angle between the radial direction of the blade corresponding to the radial direction of the propeller on which the blade is to be mounted and a tangent to the leading edge passes through a local maximum $z_{max}$ situated in the range 60% to 80% of the height of the blade, and in that the suction side face of the blade includes an indentation of concave surface extending axially from the leading edge to the trailing edge and located at a height of the blade between the local maximum $z_{max}$ and the blade tip, so as to form a reversal of curvature of the blade in the radial direction.

The inclination of the leading edge lying in the range 60% to 80% of the height of the blade serves to cause a second vortex to be formed in addition to the first vortex generated at the blade tip. This second vortex is generally co-rotating relative to the first vortex and develops on the suction side face of the blade, being guided in the concave indentation in the suction side face of the blade. Incorporating a concave indentation in the blade makes it possible at low travel speeds of the airplane, e.g. at takeoff at about Mach 0.2, to guide the second vortex to downstream from the blade. Unlike the prior art, the second vortex interacts with the first vortex downstream from the blade, thereby leading to better interaction between the first and second vortices and thus enabling the acoustic nuisance that is emitted close to the ground to be reduced.

At cruising speed, e.g. at about Mach 0.7, the air streamlines on the suction side face of the blade are substantially parallel, which means that no secondary vortex is generated on the suction side face. This means that the propulsive efficiency of the propeller is improved at cruising speed.

The invention thus makes it possible to combine the advantages of reducing sound nuisance while the blades are rotating at high speed and of achieving good propulsive efficiency at cruising speed.

Advantageously, the above-mentioned local maximum is situated at about 70% of the height of the blade.

In a preferred embodiment of the invention, the indentation has a width, measured along the height of the blade, that lies in the range 15% to 20% of the height of the blade.

The bottom of the indentation advantageously lies in the range 75% to 90% of the height of the blade.

According to another characteristic of the invention, the indentation has a depth, measured in a tangential direction, that increases going from the leading edge towards the trailing edge, thereby enabling the second vortex to better guided towards the first vortex and improving interaction between them downstream from the blade.

The invention also provides an unducted propeller for a turbine engine having a plurality of blades of the above-described type, the blades being regularly distributed around the axis of the propeller.

The invention also provides a turbine engine, such as an airplane turbojet or turboprop, having at least one unducted propeller of the above-described type.

BRIEF DESCRIPTION OF THE SEVERAL VIEWS OF THE DRAWINGS

Other advantages and characteristics of the invention appear on reading the following description made by way of non-limiting example and with reference to the accompanying drawings, in which.

DETAILED DESCRIPTION OF THE INVENTION

Figure 1:
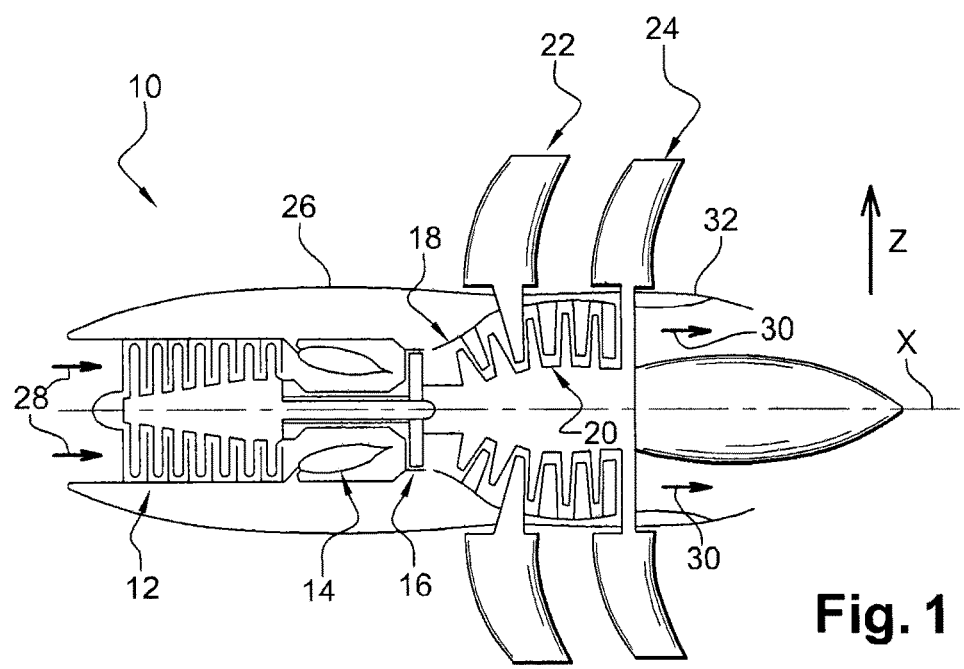
FIG. 1 is a diagrammatic axial section view of a turbine engine having unducted propellers.

Reference is made initially to FIG. 1, which shows a turbine engine 10 having unducted propellers, also known as open rotors or unducted fans, the engine comprising from upstream to downstream in the gas flow direction through the engine: a compressor 12, an annular combustion chamber 14, a high pressure turbine 16, and two low pressure turbines 18 and 20 that are contrarotating, i.e. that rotate in two opposite directions about the longitudinal axis X of the turbine engine.

Each of these downstream turbines 18 and 20 drives rotation of an external propeller 22 or 24 that projects radially outwards from the nacelle 26 of the turbine engine, the nacelle 26 being substantially cylindrical and extending along the axis X around the compressor 12, the combustion chamber 14, and the turbines 16, 18, and 20.

The stream of air 28 that penetrates into the turbine engine is compressed and then mixed with fuel and burnt in the combustion chamber 14, the combustion gas then passing through the turbines in order to drive the propellers 22 and 24 in rotation, which propellers provide the major portion of the thrust generated by the turbine engine. The combustion gas leaving the turbines is expelled through a nozzle 32 (arrows 30) in order to increase thrust.

The propellers 22 and 24 are arranged one behind the other on a common axis and each of them comprises a plurality of blades that are regularly distributed around the axis X of the turbine engine. These blades extend substantially radially and they are advantageously of variable pitch, i.e. they can be turned about their own axes in order to optimize their angular position as a function of the operating conditions of the turbine engine.

In the configuration shown in FIG. 1, the turbine engine is in a so-called "pusher" configuration. Alternatively, in a so-called "tractor" configuration (not shown), the propellers 22 and 24 are situated upstream from the nacelle.

Figure 2A:
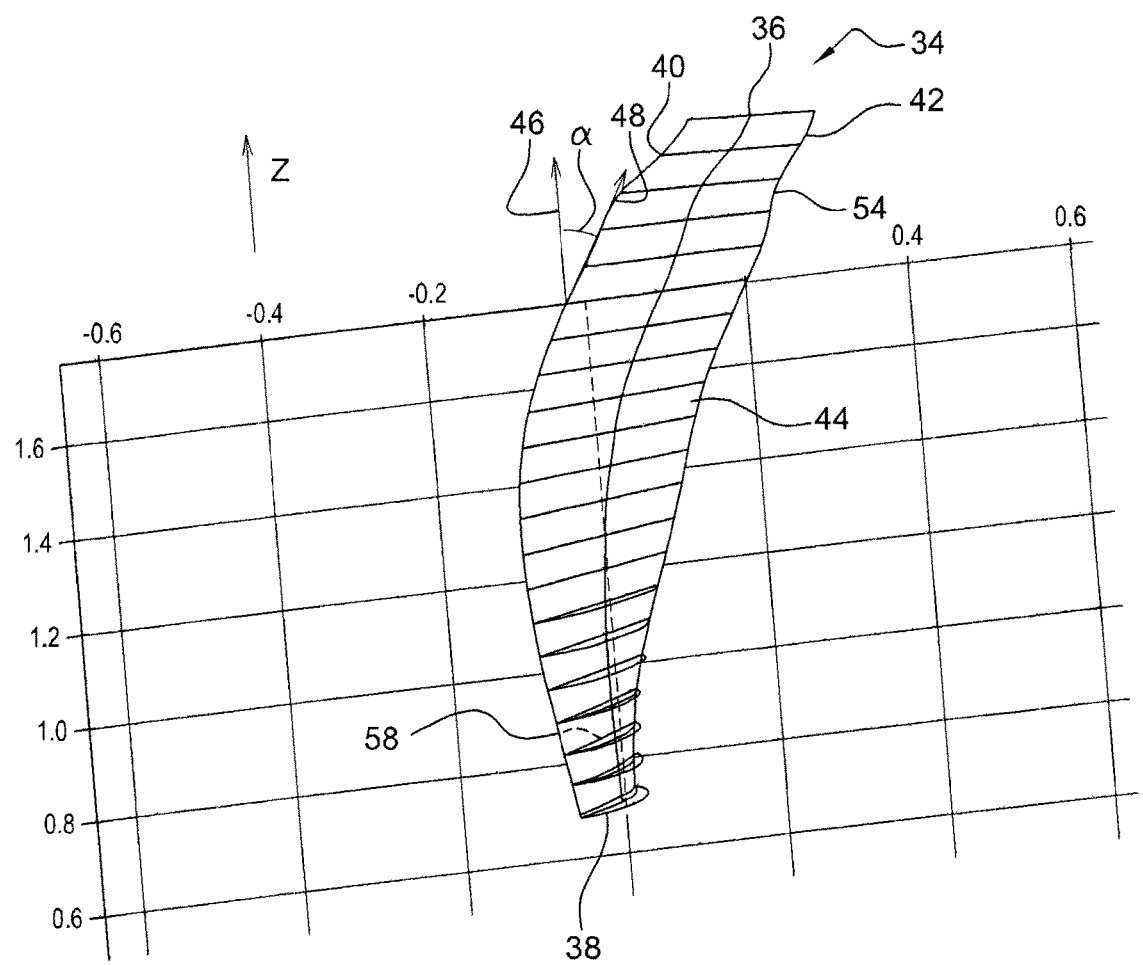
FIG. 2A is a diagrammatic view in perspective of a blade of the invention looking along a direction going towards the pressure side face of the blade.
Figure 2B:
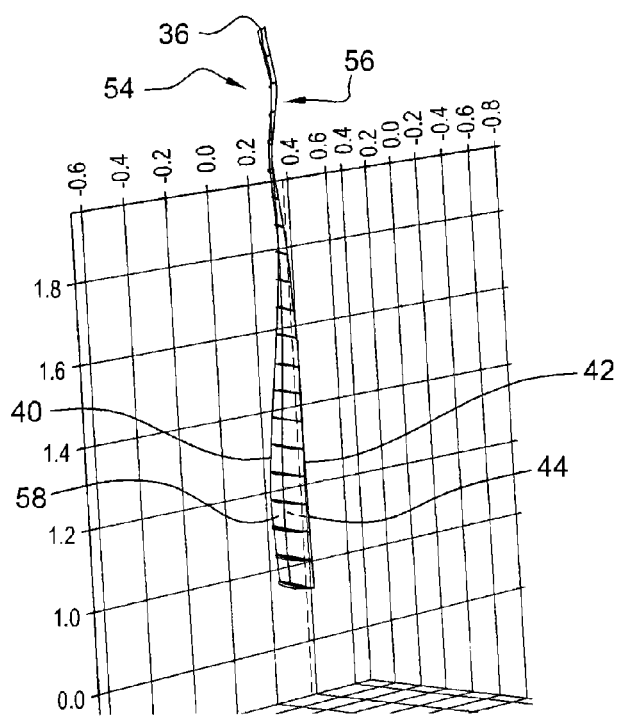
FIG. 2B is a diagrammatic perspective view of a blade of the invention seen from the leading edge.

FIG. 2A shows a blade 24 of the invention extending radially along a direction Z between a blade tip 36 and a blade root 38, longitudinally between a leading edge 40 and a trailing edge 42, and tangentially between a pressure side face 44 and a suction side face 58, with only the pressure side face being visible in FIG. 2. The direction Z is a radial direction of the blade and is equivalent to a direction perpendicular to the axis of rotation X of the propeller when the blade is mounted thereon.

Figure 3:
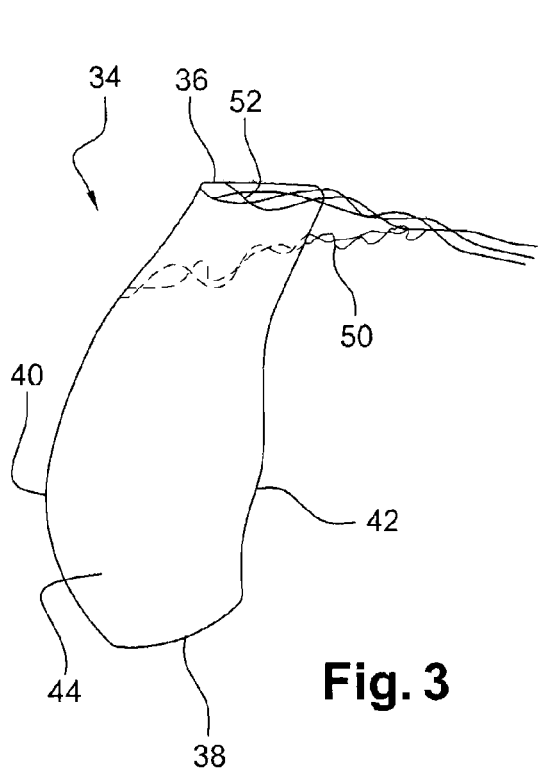
FIG. 3 is a diagrammatic view showing the formation of two vortices and how they interact.
Figure 4:
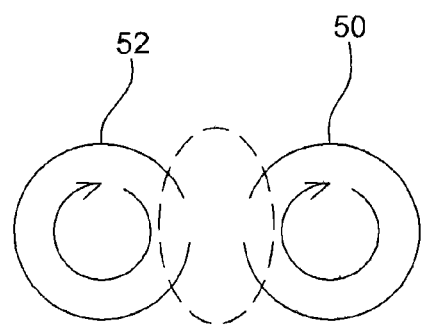
FIG. 4 is a diagrammatic view looking from upstream to downstream showing the interaction between two vortices generated by a blade of the invention.

As shown in FIG. 2A, the angle α between the radial direction 46 and a tangent 48 of the leading edge 40 passes through a local maximum situated at around 60% to 80% of the height of the blade, thereby making it possible to generate a second vortex 50 suitable for interacting with a first vortex 52 that is generated at the blade tip 36. The first and second vortices 50 and 52 are shown in FIGS. 3 and 4. The second vortex 50 flows over the suction side face 58 of the blade 34 (FIG. 3) and turns in the same direction as the first vortex 52. The mutual friction between the two vortices 50 and 52 dissipate their energy and destabilizes them, thereby serving to reduce sound emissions.

In a particular embodiment of the invention, the local maximum of the angle α is situated at about 75% of the height of the blade.

Figure 2D:
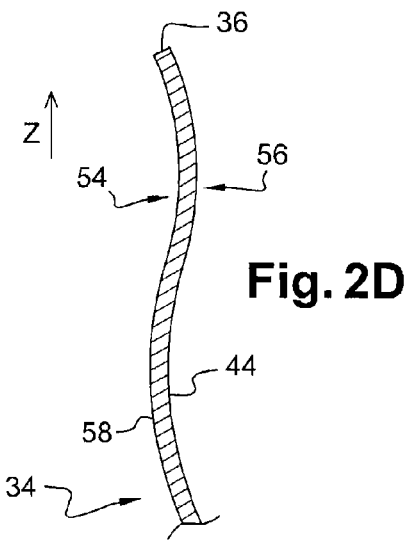
FIG. 2D is a diagrammatic radial section view of a portion of the blade of the invention, close to the blade tip.
Figure 2C:
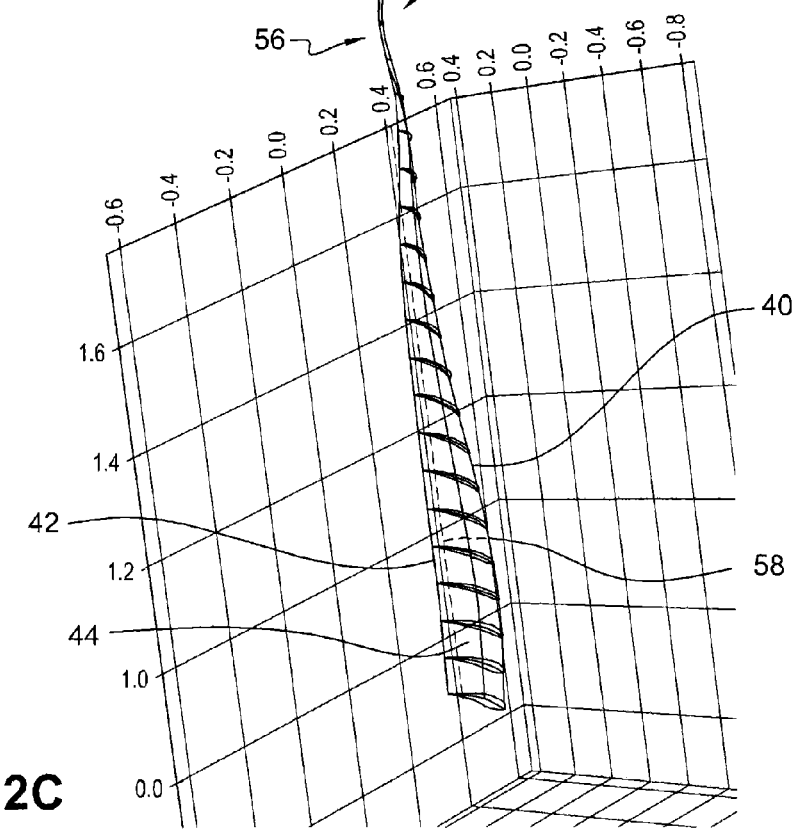
FIG. 2C is a diagrammatic perspective view of a blade of the invention seen from the trailing edge.

According to the invention, the suction side face 58 of the blade 34 also has an indentation 54 of concave shape extending axially from the leading edge 40 towards the trailing edge 42 and located at a height of the blade 34 between the local maximum $z_{max}$ and the tip of the blade 36 (FIG. 2A). This indentation 54 of concave shape in the suction side face 58 is formed facing a projection 56 of convex shape in the pressure side face 44 of the blade 34. Furthermore, the indentation 54 and the projection 56 present profiles that are similar. Thus, as shown in FIG. 2D, when the suction side face 58 presents, in a radially extending direction going towards the blade tip, a first curvature followed by a second curvature in the opposite direction, thereby defining the indentation 54, the pressure side face 44 presents in like manner a first curvature followed by a second curvature in an opposite direction defining the projection 56. In this way, the general appearance of the blade 34 presents a curvature reversal in the radial direction that is localized over the height of the blade between the local maximum $z_{max}$ and the blade tip 36.

The width of the indentation 54 measured in the height direction of the blade 34 is substantially constant and of the order of 15% to 20% of the height of the blade 34.

The bottom of the indentation 54 is situated in the range approximately 75% to 90% of the height of the blade 34.

The blade 34 of the invention can thus provide good guidance for the second vortex that is generated at the break at the height $z_{max}$ in the concave indentation 54 of the suction side face of the blade 34.

Incorporating a concave indentation 54 in the blade makes it possible at low speed, e.g. at takeoff at about Mach 0.2, to guide the second vortex 50 to downstream from the blade where it interacts with the first vortex 52 from the blade tip 36, thereby leading to a reduction in acoustic nuisance emitted when close to the ground (FIG. 3) compared with the prior art where the interaction between the first and second vortices takes place axially between the leading edge and the trailing edge.

Figure 5:
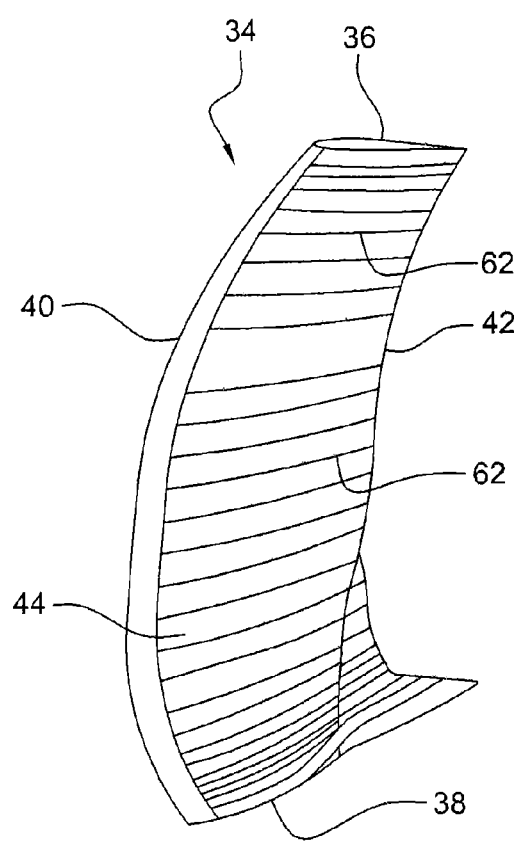
FIG. 5 shows the air streamlines on the suction side face of the blade during a cruising stage.

At cruising speed, e.g. at about Mach 0.7, the air streamlines 62 on the suction side face of the blade 34 are substantially parallel, which indicates that no secondary vortex is generated on the suction side face of the blade 34. As a result, the propulsive efficiency of the propeller is improved (FIG. 5).

Figure 6:
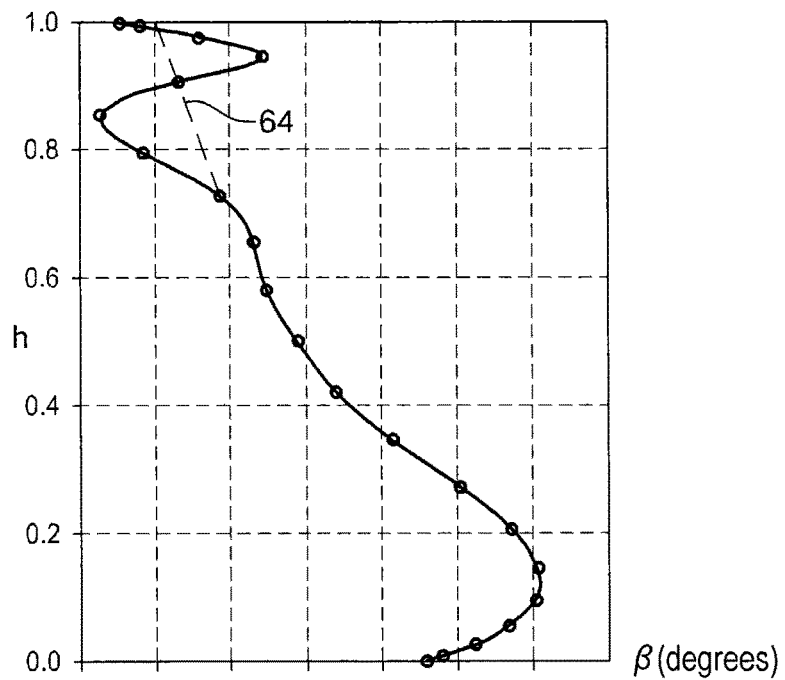
FIG. 6 is a graph showing how the angle of incidence of the air varies along the height of the blade relative to the chord of the blade and as measured at the leading edge of the blade while operating under cruising conditions.
Figure 7:
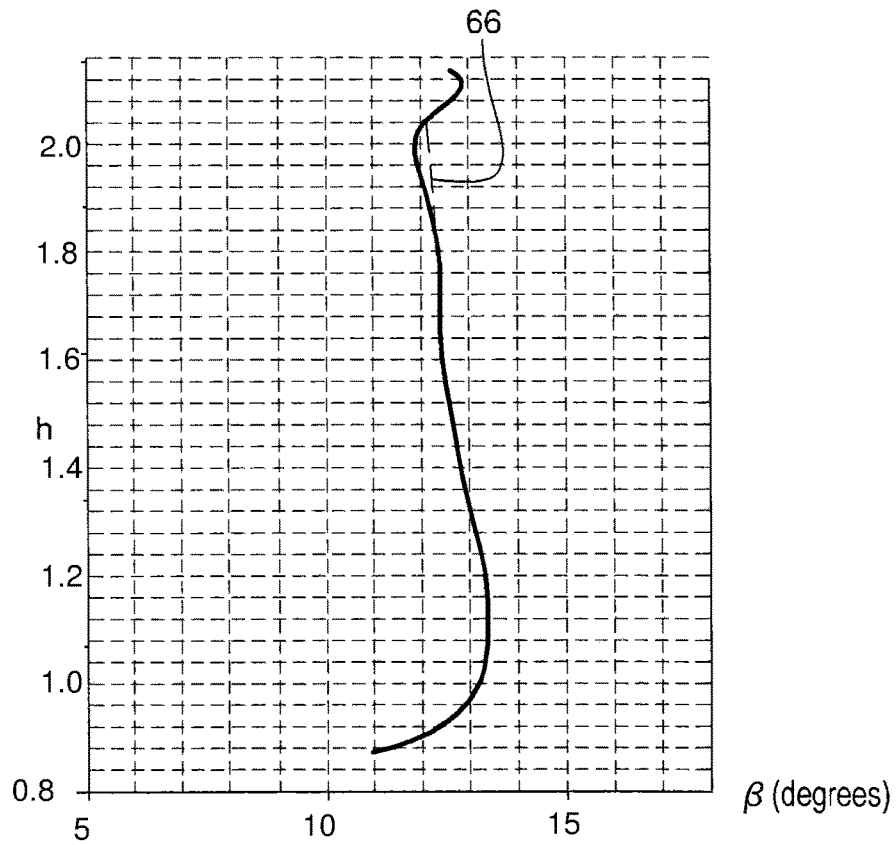
FIG. 7 is a graph showing how the angle of incidence of the air varies along the height of the blade relative to the chord of the blade and as measured at the leading edge of the blade while operating under conditions corresponding to takeoff.
Figure 8:
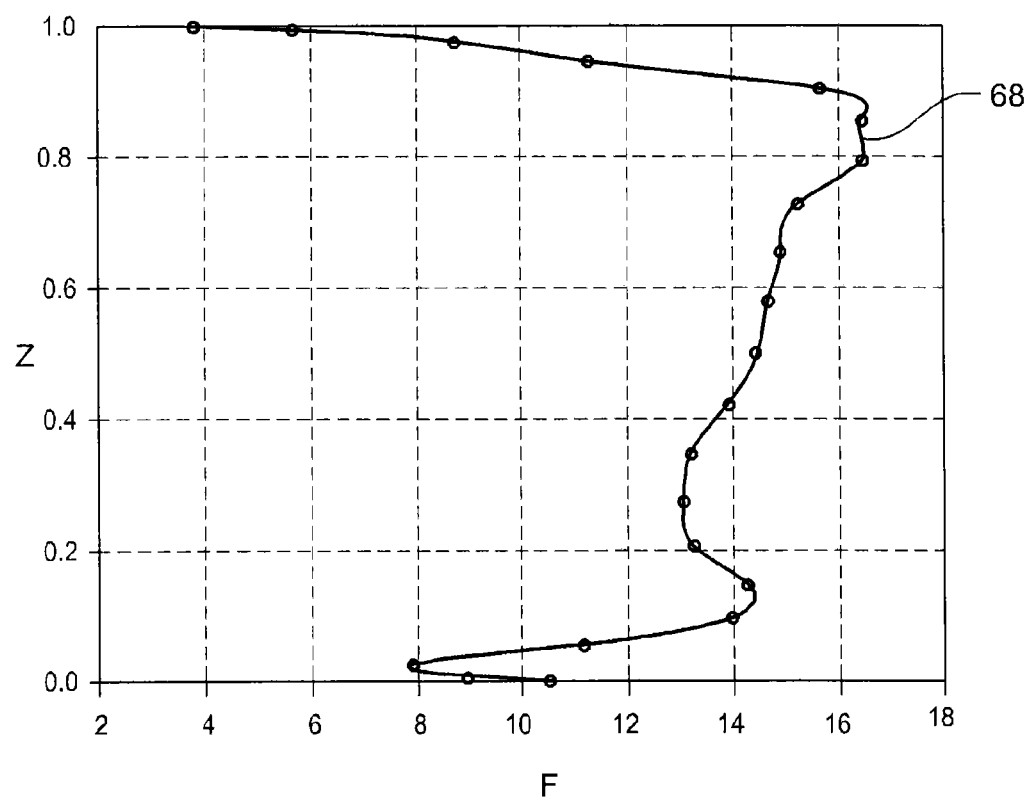
FIG. 8 is a graph showing how the lift/drag ratio varies along the height of the blade under cruising conditions.

FIG. 6 shows how the angle of incidence $\beta$ of the air relative to the chord of the blade varies along the height of the blade while operating under cruising conditions. This angle is measured along the entire height h of the blade 34. FIG. 7 shows a curve similar to that of FIG. 8 but while operating at a speed that corresponds to takeoff. In FIGS. 8 and 9, height is normalized relative to the total height of the blade.

In FIG. 6, at cruising speed, it can be seen that between 75% and 90% of the height of the blade corresponding to the position of the concave indentation, the angle of incidence decreases relative to the angle of incidence drawn in dashed lines 64 for a blade that does not have a concave indentation. This decrease in the angle of incidence in the region of the indentation demonstrates an increase in propulsive efficiency in this portion of the blade 34 compared to a blade without an indentation.

In FIG. 7, at takeoff speed, there can be observed a reduction in the angle of incidence in the region of the indentation compared with the angle of incidence shown in dashed lines 66 for a blade that does not have any indentation.

FIG. 8 shows how the lift/drag ratio (plotted along the abscissa) varies along the normalized height of the blade (plotted up the ordinate) at cruising speed. The lift/drag ratio of a blade is the ratio of its lift divided by its aerodynamic drag at a particular height of the blade. This ratio F thus gives information about the local propulsion capacity of the blade as a function of blade height. In this figure, there can be seen a peak 68 in the lift/drag ratio in the region of the blade that corresponds to the indentation in the suction side face of the blade 34, thus demonstrating that in this region the thrust capacity of the blade 34 is improved.

The invention claimed is:

1. A blade for mounting on a propeller, the blade extending radially in a height direction from a blade root to a blade tip and having a leading edge and a trailing edge, together with a pressure side face and a suction side face,
   wherein, along the leading edge, an angle between a radial direction of the blade corresponding to a radial direction of the propeller on which the blade is to be mounted and a tangent to the leading edge passes through a local maximum situated in the range 60% to 80% of a height of the blade, and
   wherein the suction side face of the blade includes an indentation of concave shape extending axially from the leading edge to the trailing edge, the indentation being entirely located at the height of the blade between the local maximum and the blade tip the blade presenting, in the radial direction towards the blade tip, a first curvature followed by a second curvature in an opposite direction from the first curvature so as to form a reversal of curvature of the blade in the radial direction, and wherein the concave shape of the indentation corresponds to the second curvature.

2. A blade according to claim 1, wherein the local maximum is situated at 75% of the height of the blade.

3. A blade according to claim 1, wherein the indentation presents a width, measured along the height of the blade, that is substantially constant.

4. A blade according to claim 1, wherein the indentation has a width, measured along the height of the blade, that lies in the range 15% to 20% of the height of the blade.

5. A blade according to claim 1, wherein a bottom of the indentation lies in the range 75% to 90% of the height of the blade.

6. A blade according to claim 1, wherein an amount of curvature of the second curvature, measured in a tangential direction, increases going from the leading edge towards the trailing edge.

7. An unducted propeller for a turbine engine, the propeller comprising a plurality of blades according to claim 1.

8. A turbine engine comprising at least one unducted propeller according to claim 7.

9. A blade according to claim 1, wherein the pressure side face of the blade includes a projection of convex shape extending axially from the leading edge to the trailing edge, and wherein the convex shape of the projection corresponds to the second curvature.

\* \* \* \* \*